United States Patent [19]

Kawase et al.

[11] Patent Number: 4,579,605

[45] Date of Patent: Apr. 1, 1986

[54] FLUX FOR BRAZING THE ALUMINUM PARTS AND PREPARING METHOD OF THE SAME

[75] Inventors: Hiroshi Kawase, Imaichi; Hajime Shintani, Izumisano; Mitsuo Miyamoto, Suita, all of Japan

[73] Assignees: Furukuwa Aluminum Co., Ltd., Tokyo; Morita Kagaku Kogyo Co., Ltd., Osaka, both of Japan

[21] Appl. No.: 697,104

[22] Filed: Feb. 1, 1985

[30] Foreign Application Priority Data

Feb. 14, 1984 [JP]  Japan ................... 59-25895
Mar. 28, 1984 [JP]  Japan ................... 59-60158

[51] Int. Cl.$^4$ .................................. B23K 35/34
[52] U.S. Cl. ........................................ 148/26
[58] Field of Search ............................ 148/26

[56] References Cited

U.S. PATENT DOCUMENTS

| | | | |
|---|---|---|---|
| 3,424,626 | 1/1969 | Coless | 148/26 |
| 3,580,748 | 5/1971 | DeLong | 148/26 |
| 3,769,099 | 10/1973 | DeLong | 148/26 |
| 3,951,328 | 4/1976 | Wallace | 148/26 |

Primary Examiner—Peter D. Rosenberg
Attorney, Agent, or Firm—Armstrong, Nikaido, Marmelstein & Kubovcik

[57] ABSTRACT

A flux for brazing the aluminum parts characterized by comprising 5 to 95 wt. % of $K_2AlF_5$ or $K_2AlF_5 \cdot H_2O$ and the remainder of $KAlF_4$ and preparing method of the same.

3 Claims, 3 Drawing Figures

FLUX FOR BRAZING THE ALUMINUM PARTS AND PREPARING METHOD OF THE SAME

DETAILED DESCRIPTION OF THE INVENTION

The present invention relates to a flux for brazing the aluminum parts comprising aluminum and aluminum alloy and a preparing method of a mixed composition comprising 5 to 95 wt% of $K_2AlF_5.H_2O$ and the remainder of $KAlF_4$ which is formed simultaneously at an arbitrary ratio and which is usable as the flux for brazing the aluminum parts comprising aluminum and aluminum alloy. The invention contributes remarkably, in particular, to the improvement in the torch brazing property in the atmosphere.

Generally, the instruments made of aluminum, for example, heat exchangers such as radiator and oil cooler for the automobile, condenser and evaporator for the air conditioner, or the like are assembled by the brazing method. All these heat exchangers consist of a passage, so called tube, which lets the media for the exchange of heat such as water for cooling the engine, engine oil, freon (gas or liquid), etc. through and fins provided at the air side of the tube in order to make the heat exchange fast. For example, the condenser core for the air conditioner is one fitted with the fins (2) machined in a corrugated form between the tube (1) which is bent in a serpentine form and through which the medium passes as shown in FIG. 1, and the brazing method is employed for the bonding of the tube and the fins. The brazing method as this is either to make the surface of the aluminum parts to be formed into the tube or fin clad with Al—Si type alloy brazing material beforehand or to insert a thin plate of Al—Si type alloy brazing material between the tube and the fin, and then, to heat to a temperature slightly higher than the fusing temperature of said brazing material, that is, to 590° to 620° C. The flux is used at the time of this heating in order to improve the flowability and the wettability of Al—Si type alloy brazing material by destroying the oxide film on the surface of the aluminum parts.

Conventionally, chlorides have been mixed to use as the flux for brazing the aluminum parts. Namely, mixtures of chlorides such as NaCl, KCl, LiCl, $ZnCl_2$, etc. with fluorides such as $AlF_3$, KF, NaF, LiF, etc. mixed in an appropriate proportion have been used hitherto as the fluxes for brazing the aluminum parts. However, these fluxes should be removed surely by means of hot water and acid after brazing. If the flux remains, the aluminum parts are subjected to the corrosion, since chlorides become to electrolytes resulting from their hygroscopicity. Moreover, the removal of the flux with hot water and acid causes an increase in cost price, since the effluent treatment is to be accompanied necessarily by the reason of pollution. Furthermore, 100 to 400 g of the flux should be used for one heat exchange to be brazed. This creates further a cause of cost-up.

In order to improve these shortcomings, fluxes consisting of fluoride alone have been developed and put to practical use recently. These are, for example, a flux comprising 53 to 55 wt% of $AlF_3$ and the remainder of KF (specification of Great British Pat. No. 1,055,914), and a flux comprising 65.6 to 99.9 wt% of $KAlF_4$ and the remainder of $K_3AlF_6$ (Japanese Patent Publication No. 27,037/1983). Particularly, the $KAlF_4$—$K_3AlF_6$ flux has an extremely high activity. Therefore, it exerts a destroying effect of the oxide film in amounts less than those of aforementioned chloride type fluxes. Moreover, if the brazing is conducted in a nonoxidative circumstance, the amounts to be used become lesser further, so that the use of flux comes to an end in amounts of 10 to 30 g per one heat exchanger. Furthermore, even if the flux residues remain after brazing as they are, they neither absorb the moisture nor occur the corrosion. Therefore, there is an advantage to be able to omit the treatment for the removal of flux.

However, since these fluxes are prepared through fusing after synthesized by wet process, the preparing method is very difficult and there arises a shortcoming to become very expensive because of the incorporation of the fusing process. For example, in Japanese Patent Publication No. 27,037/1983, a mixed flux of $KAlF_4$ with $K_3AlF_6$ is prepared by pulverizing after fusing $AlF_3$ and KF. However, the fused fluorides described above have such a high activity that they erode the vessel. Therefore, the quality of material of the vessel is limited. In above publication, a crucible made of graphite is used, but the graphite crucible is not preferable because of the occurrence of outside leakage resulting from its porosity. Also, the porcelain crucibles made of alumina ($Al_2O_3$) etc. are not eroded so seriously, but they are broken after used twice or thrice. Further, since the flux fused and solidified is in a form of flake, the pulverizing process is necessary to bring it into powder. While, aforementioned $AlF_3$—KF flux is one mixed $AlF_3$ with KF and is inexpensive, but this is inferior in the brazing property compared with $KAlF_4$—$K_3AlF_6$.

In view of these situation, the inventors had investigated from various angles and, as a result, developed and proposed a flux for brazing the aluminum parts which could be prepared easily and was low in cost price and which showed a brazing property similar to that of aforementioned $KAlF_4$—$K_3AlF_6$ flux in a nonoxidative circumstance. This flux consisted of potassium pentafluoroaluminate hydrate ($K_2AlF_5.H_2O$) having a purity of more than 95 wt% and could be prepared easily and inexpensively through the chemical synthesis using fluoric acid (HF), aluminum hydroxide [$Al(OH)_3$] and potassium fluoride (KF).

However, although these fluoride type fluxes proved to have a good brazing property on brazing in a nonoxidative circumstance, they had a shortcoming that the satisfactory brazing property was not necessarily obtained on brazing using torch (flame of oxygen-acetylene) in the atmosphere.

The invention concerns a flux for brazing the aluminum parts which was developed from various investigations in condition of above and which can improve the brazing property to a great extent not only on brazing in a nonoxidative circumstance, but also on torch brazing in the atmosphere, and is characterized by comprising 5 to 95 wt% of $K_2AlF_5$ or $K_2AlF_5.H_2O$ and the remainder of $KAlF_4$.

Namely, the flux of the invention can be obtained easily by mixing $K_2AlF_5$ or $K_2AlF_5.H_2O$ with $KAlF_4$, or by synthesizing chemically after mixed aqueous fluoroaluminic acid ($HAlF_4$, $H_2AlF_5$ and $H_3AlF_6$) with potassium compound in an appropriate proportion. The flux thus obtained has a suitable reactivity for the brazing, is excellent in the brazing property in a nonoxidative circumstance and is also improved remarkably in the torch brazing property in the atmosphere. The reason why the content of $K_2AlF_5$ or $K_2AlF_5.H_2O$ is confined thereby within a range of 5 to 95% is due to that the torch brazing property in the atmosphere decreases significantly when the content is not more than 5 wt% or it exceeds 95 wt%.

Besides, $K_2AlF_5$ of the invention can be prepared easily by mixing HF solution, KF and $Al(OH)_3$ in an appropriate proportion and submitting to the chemical synthesis. Even if $K_2AlF_5 \cdot H_2O$ (stable in this state) in which one mole of water is attached to $K_2AlF_5$ as the water of crystallization is formed depending on the final drying conditions, the brazing property quite similar to that of $K_2AlF_5$ is obtained.

The invention also concerns a preparing method of the flux, wherein a mixed composition comprising $K_2AlF_5 \cdot H_2O$ and $KAlF_4$, the preparation of the former thereby being said to be very difficult particularly among a series of potassium fluoroaluminate complexes, is prepared easily, inexpensively and stably at an arbitrary ratio, and is characterized in that a mixed composition comprising 5 to 95 wt% of $K_2AlF_5 \cdot H_2O$ and the remainder of $KAlF_4$, the melting point of all of the mixed compositions thereby being within a range of 555° to 574° C., is prepared simultaneously at an arbitrary ratio by dissolving aluminum hydroxide into hydrofluoric acid having a concentration of 5 to 40 wt% within a range of Al:F ratio of 1:4–4.5, by submitting this then to the neutralization reaction with potassium compound at a temperature of 30° to 100° C. under acidic condition (pH=below 4) within a range of Al:F:K ratio of 1:4–4.5:1–1.5, and by treating to separate conventionally.

In the invention, indispensable conditions to obtain the mixed composition of $K_2AlF_5 \cdot H_2O$ and $KAlF_4$ stably are that the concentration of hydrofluoric acid is 5 to 40 wt%, that the raw material ratio Al:F:K is within a range of 1:4–4.5:1–1.5, that the nature of solution (pH) at a time of the completion of reaction when submitting to the neutralization reaction with potassium compound is acidic with a pH value of below 4 and the reaction temperature is within a range of 30° to 100° C., and that the drying temperature of the mixed composition is sufficient to be at about 100° C.

The potassium compound usable in the invention is potassium carbonate or aqueous solution of potassium hydroxide having a concentration of 5 to 50 wt%.

Besides, in the invention, the criterion of the grade of mixed composition was placed on that one, the content of the impurity thereof being not more than 1.5 wt%, is high grade and the other, the content of the impurity thereof being not less than 1.5 wt%, is low grade, after satisfied that the mixed composition was comprised 5 to 95 wt% of $K_2AlF_5 \cdot H_2O$ and the remainder of $KAlF_4$.

For the analysis of the composition, the elementary analyses of fluorine and aluminum were carried out and the ratios of $K_2AlF_5 \cdot H_2O$ and $KAlF_4$ were calculated according to the following equations. These composition ratios were consistent sufficiently with the results of X-ray diffraction analysis and differential thermal analysis.

$$F \text{ content (wt. \%)} = \chi \times \frac{5F}{K_2AlF_5 \cdot H_2O} + \gamma \times \frac{4F}{KAlF_4}$$

$$Al \text{ content (wt. \%)} = \chi \times \frac{Al}{K_2AlF_5 \cdot H_2O} + \gamma \times \frac{Al}{KAlF_4}$$

wherein,
$x$ = wt.% of $K_2AlF_5 \cdot H_2O$
$y$ = wt.% of $KAlF_4$

In following, the invention will be explained in detail using examples.

EXAMPLES 1-6 AND COMPARATIVE EXAMPLE 1-6

Using a flat extruded multihole tube (1) which had been moulded extruding JIS 1050 (Al over 99.5%) by the ordinary method and formed to have four longitudinal holes (1a) as shown in FIG. 2, and a brazing sheet having a thickness of 0.15 mm which consisted of the core material of JIS 3003 (alloy comprising Al-0.15 wt.% Cu-1.1 wt.% Mn) clad on both sides of it with aluminum alloy brazing material of JIS 4343 (alloy comprising Al-7.5 wt% Si), as shown in FIG. 1, the extruded multihole tube (1) was bent in a serpentine form and the fins (2) machined the brazing sheet in a corrugated form were put in the bent tube (1) to fix with jig. This was immersed respectively into 5% aqueous solutions of the fluxes of the invention, comparative fluxes and conventional fluxes shown in Table 1 to coat the flux. Following this, the moisture was evaporated completely in the drying oven heated at 200° C., and then brazing was carried out by heating for 5 minutes at a temperature of 610° C. in the oven under $N_2$ gas circumstance to make the condenser core for the air conditioner as shown in FIG. 1.

The brazing property was examined of the condenser cores thus made. Results are set down in Table 1. Besides, the brazing property was expressed by the bonding rate, and the bonding rates of over 98%, 50 to 98% and below 50% were judged as excellent, poor and fail, respectively.

Moreover, as shown in FIG. 3, aluminum plates (3a), (3b) of JIS 3003 having a thickness of 1.2 mm were brought together so as to make a T shape, and the aluminum alloy brazing material (4) of JIS 4047 (alloy comprising Al-12 wt.% Si) having a diameter of 1.5 mm was placed on one side of the bonding portion. After 40% aqueous solution of the fluxes shown in Table 1 was coated on the aforementioned bonding portion and the aluminum alloy brazing material (4) with a writing brush, brazing was carried out blowing the combustion gas of oxygen-acetylene to this portion with torch to examine the brazing property. Results are set down in Table 1. Besides, the brazing property was judges as follows: it is excellent when the brazing filler flows and turns round sufficiently to the opposite side and the fillets are formed uniformly on both sides, it is poor when the turnround of the brazing filler is not uniform, and it is fail when the brazing filler does entirely not turn round to the opposite side.

TABLE 1

| Distinction of flux | | Composition of flux (wt. %) | | | Brazing property | |
|---|---|---|---|---|---|---|
| | | $K_2AlF_5 H_2O$ | $KAlF_4$ | $K_3AlF_6$ | In $N_2$ gas circumstance | In atmosphere (Torch brazing) |
| Example No. | | | | | | |
| 1 | Flux of the invention | 5 | 95 | — | Excellent | Excellent |

TABLE 1-continued

| | Distinction of flux | Composition of flux (wt. %) | | | Brazing property | |
|---|---|---|---|---|---|---|
| | | $K_2AlF_5 \cdot H_2O$ | $KAlF_4$ | $K_3AlF_6$ | In $N_2$ gas circumstance | In atmosphere (Torch brazing) |
| 2 | " | 10 | 90 | — | " | " |
| 3 | " | 30 | 70 | — | " | " |
| 4 | " | 50 | 50 | — | " | " |
| 5 | " | 80 | 20 | — | " | " |
| 6 | " | 95 | 5 | — | " | " |
| Comparative example | | | | | | |
| 1 | Comparative flux | 3 | 97 | — | " | Poor |
| 2 | " | 97 | 3 | — | " | Fail |
| 3 | " | 100 | 0 | — | " | " |
| 4 | Conventional flux | — | 95 | 5 | Poor | Poor |
| 5 | " | — | 80 | 20 | " | " |
| 6 | " | 54 wt. % $AlF_3$—46 wt. % KF | | | Poor | Fail |

As evident from Table 1, it can be seen that on brazing used the fluxes of the invention Example 1-6, the brazing property is excellent both in a $N_2$ gas circumstance and in the atmosphere, and the turn-round of the brazing filler is also good.

On the contrary, when used the comparative fluxes being out of the composition range of the invention Comparative example 1-2, the flux previously proposed and consisting of $K_2AlF_5$ alone Comparative example 3, and the conventional fluxes Comparative example 4-6 for brazing, the brazing property is poor to fail in all cases of torch brazing in the atmosphere. Therefore, it is known that the brazing property when used them is inferior to that when used the fluxes of the invention.

As described above, the flux of the invention can improve the brazing property significantly not only on brazing in a nonoxidative circumstance, but also on torch brazing in the atmosphere. On brazing of the condenser core etc. for the air conditioner, a bonding rate of more than 97% is required practically from a point of thermal efficiency. Although it was very difficult to meet this with the conventional fluoride type fluxes, with the flux of the invention, this can be satisfied easily. For this reason and others, the invention exerts a remarkable effect industrially.

EXAMPLE 7-14

Into real quantity 1400 g of hydrofluoric acid (HF) were dissolved 1360 g of aluminum hydroxide [Al(OH)$_3$]. Then, real quantity 980 g of potassium hydroxide (KOH) were thrown into this solution within a range of the reaction temperature of 30° to 100° C. After filtered off and separated, the product was dried (100° C.) and subjected to the analysis of composition Results are shown in Table 2.

TABLE 2

| Example No. | Concentration of HF (wt. %) | Concentration of KOH (wt. %) | Molar ratio of raw material (Al:F:K) | Reaction temperature (°C.) | Composition | |
|---|---|---|---|---|---|---|
| | | | | | $KAlF_4$ (wt. %) | $K_2AlF_5 \cdot H_2O$ (wt. %) |
| 7 | 20 | 25 | 1:4:1 | 30 | 1.5 | 98.5 |
| 8 | 20 | 25 | 1:4:1 | 40 | 5 | 95 |
| 9 | 20 | 25 | 1:4:1 | 50 | 32 | 68 |
| 10 | 20 | 25 | 1:4:1 | 60 | 54 | 46 |
| 11 | 20 | 25 | 1:4:1 | 70 | 71 | 29 |
| 12 | 20 | 25 | 1:4:1 | 80 | 83 | 17 |
| 13 | 20 | 25 | 1:4:1 | 90 | 98.5 | 1.5 |
| 14 | 20 | 25 | 1:4:1 | 100 | 95 | 5 |

In addition, with regard to respective composition ratios, results of the measurement of melting point are shown in Table 3.

TABLE 3

| Example No. | Composition | | m.p. (°C.) |
|---|---|---|---|
| | $KAlF_4$ (wt. %) | $K_2AlF_5 \cdot H_2O$ (wt. %) | |
| 7 | 1.5 | 98.5 | 555 |
| 9 | 32 | 6.8 | 560 |
| 10 | 54 | 46 | 565 |
| 11 | 71 | 29 | 570 |
| 13 | 98.5 | 1.5 | 575 |

COMPARATIVE EXAMPLE 7-8

Composition analysis was carried out under the same conditions as in Example 7-14 except that the reaction temperature were made 20° C. and 110° C. As a result, much impurities were found in both cases and the mixed compositions could not be prepared in high grade.

EXAMPLE 15-17

The concentration of hydrofluoric acid, the concentration of potassium hydroxide and the reaction temperature were kept quite same as in Example 10, and the raw material ratio (molar ratio) of Al, F and K was varied as in Example 15-17. Results are shown in Table 4.

TABLE 4

| Example No. | Concentration of HF (wt. %) | Concentration of KOH (wt. %) | Molar ratio of raw material (Al:F:K) | Reaction temperature (°C.) | Composition | |
|---|---|---|---|---|---|---|
| | | | | | $KAlF_4$ (wt. %) | $K_2AlF_5 \cdot H_2O$ (wt. %) |
| 10 | 20 | 25 | 1:4:1 | 60 | 54 | 46 |
| 15 | 20 | 25 | 1:4.5:1 | 60 | 48 | 52 |
| 16 | 20 | 25 | 1:4:1.5 | 60 | 45 | 55 |

TABLE 4-continued

| Example No. | Concentration of HF (wt. %) | Concentration of KOH (wt. %) | Molar ratio of raw material (Al:F:K) | Reaction temperature (°C.) | Composition | |
|---|---|---|---|---|---|---|
| | | | | | $KAlF_4$ (wt. %) | $K_2AlF_5.H_2O$ (wt. %) |
| 17 | 20 | 25 | 1:4.5:1.5 | 60 | 41 | 59 |

COMPARATIVE EXAMPLE 9-10

Comparative analysis was carried out under the same conditions as in Example 10 and 15-17 except that the raw material ratios of Al, F and K were made 1:5:1 and 1:4:2. As a result, much impurities were found in both cases and the mixed compositions could not be prepared in high grade.

EXAMPLE 18-19

The concentration of potassium hydroxide, the reaction temperature and the raw material ratio were kept quite same as in Example 10, and the concentration of hydrofluoric acid was varied. Results are shown in Table 5.

TABLE 5

| Example No. | Concentration of HF (wt. %) | Concentration of KOH (wt. %) | Molar ratio of raw material (Al:F:K) | Reaction temperature (°C.) | Composition | |
|---|---|---|---|---|---|---|
| | | | | | $KAlF_4$ (wt. %) | $K_2AlF_5.H_2O$ (wt. %) |
| 18 | 5 | 25 | 1:4:1 | 60 | 47 | 53 |
| 10 | 20 | 25 | 1:4:1 | 60 | 54 | 46 |
| 19 | 40 | 25 | 1:4:1 | 60 | 60 | 40 |

COMPARATIVE EXAMPLE 11-12

Composition analysis was carried out under the same conditions as in Example 10 and 18-19 except that the concentrations of hydrofluoric acid were made 3 wt.% and 50 wt.%. As a result, much impurities were found in both cases and the mixed compositions could not be prepared in high grade.

EXAMPLE 20-21

The concentration of hydrofluoric acid, the reaction temperature, and the raw material ratio were kept quite same as in Example 10, and the concentration of potassium hydroxide was varied. Results are shown in Table 6.

TABLE 6

| Example No. | Concentration of HF (wt. %) | Concentration of KOH (wt. %) | Molar ratio of raw material (Al:F:K) | Reaction temperature (°C.) | Composition | |
|---|---|---|---|---|---|---|
| | | | | | $KAlF_4$ (wt. %) | $K_2AlF_5.H_2O$ (wt. %) |
| 20 | 20 | 5 | 1:4:1 | 60 | 48 | 52 |
| 10 | 20 | 25 | 1:4:1 | 60 | 54 | 46 |
| 21 | 20 | 50 | 1:4:1 | 60 | 59 | 41 |

COMPARATIVE EXAMPLE 13-14

Composition analysis was carried out under the same conditions as in Example 10 and 20-21 except that the concentrations of potassium hydroxide were made 3 wt.% and 55 wt.%. As a result, much impurities were found in both cases and the mixed compositions could not be prepared in high grade.

EXAMPLE 22-25

In general, inorganic complexes such as $K_2AlF_5.H_2O$ and $KAlF_4$ can vary their compositions greatly depending on the nature of solution (pH) at a time of the completion of reaction. Therefore, X-ray diffraction analysis of the products was made varying the nature of solution at a time of the completion of reaction. The analysis was carried out under quite same conditions as in Example 10 except the variation of the nature of solution. Results are shown in Table 7. From the results in Table 7, it is particularly preferable to bring the nature of solution to acidic side, that is, pH value of lower than 2 at a time of the reaction. This is because fluoroaluminum ions are subjected to the hydrolysis to cause the precipitation of aluminum hydroxide, of pH value rises to higher than 4.

TABLE 7

| Example No. | Nature of solution (pH) at the completion of reaction | Degree of content of impurities |
|---|---|---|
| 22 | Below 1 | |
| 23 | 2 | |
| 24 | 3 | □ |
| 25 | 4 | △ |

Extremely traceable quantity
□ Traceable quantity
△ Small quantity

COMPARATIVE EXAMPLE 15-17

X-ray diffraction analysis of the products was carried out under quite same conditions as in Example 22-25 except that the natures of solution (pH) at a time of the completion of reaction were made 5, 6, 7 and 8. As a result, much impurities were recognized in all cases.

Besides, in examples described above, an aqueous solution of potassium hydroxide was used as a potassium compound. However, it was confirmed that the use of potassium carbonate had also no influence on the aforementioned composition ratios.

As evident from the examples above, according to the present invention, the flux for brazing the aluminum parts comprising 5 to 95 wt.% of $K_2AlF_5.H_2O$ and the remainder of $KAlF_4$ can be prepared easily, inexpensively and stably.

Figure 1:
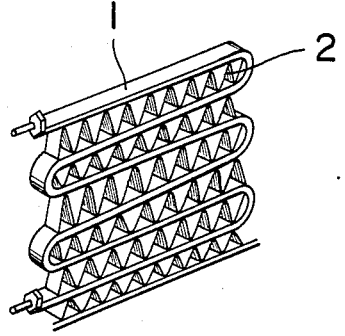
FIG. 1 is an oblique view showing one example of the condenser core for the air conditioner.
Figure 2:
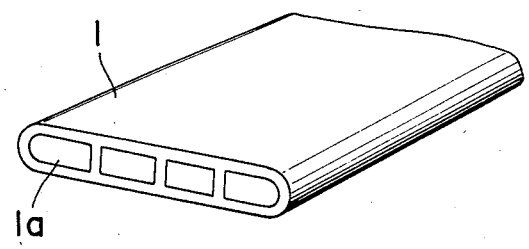
FIG. 2 is an oblique view showing one example of the extruded multihole tube for the same core.
Figure 3:
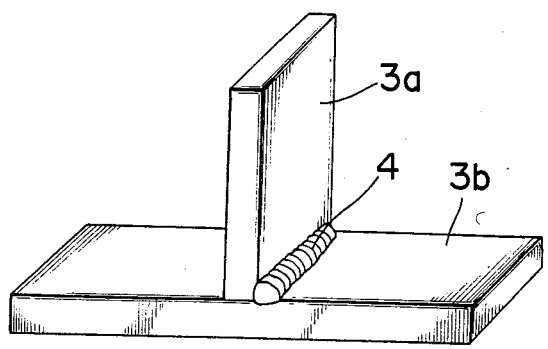
FIG. 3 is an oblique view before brazing of the T shape bonding material to examine the torch brazing property in the atmosphere.

| 1 | Extruded multihole tube |
| --- | --- |
| 2 | Fin |
| 3a, 3b | Aluminum plate |
| 4 | Brazing material |

What is claimed is:

1. A flux for brazing aluminum parts comprising 5 to 95 wt. % of at least one member selected from the following group, $K_2AlF_5$ and $K_2AlF_5.H_2O$, the remainder being $KAlF_4$.

2. A method for the preparation of a flux for brazing lauminum parts, comprising:
    (a) mixing 5 to 95 wt. % of at least one member selected from the following group, $K_2AlF_5$ and $K_2AlF_5.H_2O$ with $KAlF_4$, by dissolving, simultaneously at an arbitrary ratio, aluminum hydroxide into hydrofluoric acid having a concentration of 5 to 40 wt. %, within range of Al:F ration of 1:4–4:5; and
    (b) submitting the product to a neutralization reaction with a potassium compound at a temperature of 30° to 100° C., under acidic conditions, a pH below 4, within a range of Al:F:K ratio of 1:4–4.5:1.5.

3. The method for the preparation of a flux for brazing aluminum parts, as described in claim 2, wherein the potassium compound is a member selected from one of the following, potassium carbonate, and an aqueous solution of potassium hydroxide, having a concentration of 5 to 50 wt. %.

* * * * *